Patented Aug. 3, 1954

2,685,587

UNITED STATES PATENT OFFICE 2,685,587

PREPARATION OF DIMERCAPTIDES OF 1,3,4-THIADIAZOLE-2,5-DITHIOL

Roland H. Goshorn, Trenton, and William W. Levis, Jr., Wyandotte, Mich., assignors to Sharples Chemicals Inc., a corporation of Delaware No Drawing. Application February 11, 1952, Serial No. 271,071

9 Claims. (Cl. 260—302)

This invention pertains to a new method for the production of dimercaptides of 1,3,4-thiadiazole-2,5-dithiol.

The original process for the production of dimercaptides of this type was proposed many years ago by Busch, in the Berichte der Deutschen Chemischen Gesellschaft, volume 27, page 2518. Others who have prepared such mercaptides have employed the method of Busch or slight modifications thereof.

The Busch method involves the reaction of hydrazine, carbon disulfide, and potassium hydroxide in aqueous-alcoholic medium, the alcohol being present in very large amount as compared to the other components of the reaction mixture. Such use of alcohol, although having the obvious effect of producing a single-phase reaction mixture, introduces marked disadvantages particularly when it is desired to prepare large amounts of the dimercaptides, as in commercial operation.

The large quantities of alcohol employed in the prior art processes militate seriously against good economy, since reactors of large volume must be provided in order to produce relatively small amounts of the desired dimercaptides. Furthermore, the operator is faced with the dilemma of recovering the alcohol at considerable cost or of foregoing recovery, thus necessitating the procurement of additional alcohol from market sources for further operation.

The dimercaptides of the present invention are highly useful and versatile intermediates for chemical synthesis. For example, they react readily with a variety of compounds. Many such reactions can be carried out to excellent advantage in aqueous media, such media being particularly desirable in instances where the compound being reacted with the dimercaptide is substantially unreactive to water, but is reactive not only to the dimercaptide but also to alcohol. In such instances, it is obvious that the dimercaptide, if it has been prepared in the presence of alcohol, should be separated therefrom before being employed for reaction purposes, in order to avoid side reactions and difficultly separable mixtures.

A technically practicable process for the production of dimercaptides of 1,3,4-thiadiazole-2,5-dithiol should fulfill the following requirements: (1) the reaction by which the dimercaptides are produced should proceed at a reasonable rate; (2) the desired products should be formed in high yield and good purity; (3) it should be possible to prepare a relatively large quantity of product per unit of reactor volume; (4) when desired, it should be possible, upon completion of the reaction and without additional processing, to have a finished product consisting of an aqueous solution of the desired dimercaptide material admixed with substantially no other organic material; (5) when desired, it should be possible to recover the dimercaptide material in solid form, such as by evaporation of the reaction mixture.

The processes disclosed in the prior art, although they fulfill requirements 1, 2 and 5 above, fail with respect to requirements 3 and 4. The process of the present invention, on the other hand, meets all the foregoing requirements. Thus the commercial production of the desired dimercaptides has been made feasible for the first time.

Contrary to the teachings of the prior art, it has been discovered that organic solvents, such as alcohol, need not be present in reaction mixtures employed in producing the desired dimercaptides. In other words, it has been found that the desired reaction can be caused to proceed satisfactorily in a non-homogeneous system.

In the practice of the present invention, hydrazine is reacted with carbon disulfide and an hydroxide in accordance with the following overall equation:

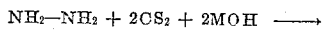

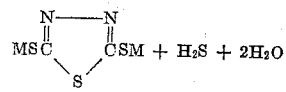

wherein M is an alkali metal, such as sodium or potassium, or an ammonium radical. The reaction is conducted in aqueous medium, preferably with vigorous agitation of the reaction mixture.

The reactants may be combined in any desired order. It is preferred, however, that the hydroxide and the carbon disulfide be not brought together except in the presence of the hydrazine in order to avoid possible reaction between the carbon disulfide and the hydroxide. A convenient way of combining the reactants in batch operation is to add the hydrazine and the hydroxide to the reaction vessel, followed by the addition of the carbon disulfide either in liquid or gaseous phase.

The reaction may be conducted at any desired pressure, that is, at atmospheric, sub-atmospheric, or super-atmospheric pressure, atmospheric pressure being very convenient.

The reaction may be conducted at any desired temperature, such as temperatures between 20° C. and 150° C., particularly between 20° C. and 110° C. and more particularly between 40° C. and 100° C.

In order to speed up the reaction and to carry the reaction to the right with good yields, it is preferred to bleed off hydrogen sulfide from the reaction zone, preferably under reflux conditions, so as not to bleed off carbon disulfide from the reaction zone, the condensed carbon disulfide returning to the reaction zone. In batch operations, removal of hydrogen sulfide can be conveniently (though not necessarily) delayed until after all of the carbon disulfide has been added, whereupon such removal can be speeded up by having the reaction mass at a temperature of at least 45° C. and preferably somewhat higher, such as at least 70° C. The maximum temperature does not appear to be critical, but for good operation in guarding against the possible formation of undesired by-products, preferably does not exceed 150° C., such as around 130° C. or 140° C. Similar considerations apply to continuous or semi-continuous operations.

After a stoichiometric quantity of carbon disulfide has been added to the reaction mixture, preferably gradually, it has been found advantageous in some instances to elevate the temperature of the mixture, in order to assist removal of hydrogen sulfide and thus to drive the reaction to completion more rapidly. At times it may be that some carbon disulfide is entrained with the escaping hydrogen sulfide. In such instances, it is desirable to cool the mixture somewhat, add carbon disulfide as make-up, and again elevate the temperature.

While any desired quantity of hydroxide may be employed beyond a stoichiometric quantity as shown in the above equation, it is preferred to employ a substantially stoichiometric quantity of hydroxide so that the by-product sulfur compound may be removed from the reaction zone in the vapor phase, i. e. as hydrogen sulfide. This not only affords economy in the use of hydroxide, but also yields a product uncontaminated with by-product sulfur compound or compounds, the product being obtained in the form of a water solution of the dimercaptide.

Should less than a stoichiometric quantity of the hydroxide be employed, it will, of course, be understood that the product will contain the desired dimercaptide in admixture with at least some undesired by-products. In other words, while it is preferred to employ each of the reactants in stoichiometric amounts for the reasons given above, it will be understood that any of the three reactants may be employed in other than stoichiometric amounts if desired for any reason, and with the result that the dimercaptide will be produced in rather impure form.

Examples of alkali metal hydroxides are sodium hydroxide and potassium hydroxide. Any of the other alkali metal hydroxides may be employed. The ammonium radical is supplied by the use of ammonium hydroxide. A mixture of such bases may be employed if desired, in which case a mixed product is to be expected.

As pointed out above, an outstanding feature of this invention is that the process is conducted in aqueous media, both hydrazine and the hydroxide as well as dimercaptide product being soluble therein. An aqueous medium has an additional advantage in that one of the reaction products is water, and by the bleeding off of hydrogen sulfide the dimercaptide product is obtained in relatively pure form in water solution.

The mechanism of the overall reaction shown in the foregoing equation is not well understood. It has been observed that ordinarily the evolution of hydrogen sulfide does not reach a peak until after addition of the full stoichiometric quantity of carbon disulfide to the other reactants. Although the applicants do not wish to be bound by any particular theory, the observed behavior suggests possible formation of a precursor of the desired product at some stage of the reaction.

The reaction proceeds smoothly and increases in rapidity with elevation of temperature. The use of a reaction assistant, such as a catalyst, is not required, but is not precluded if desired for any reason.

A further feature of the invention resides in the discovery that addition of a small amount of an emulsifying agent to the reaction zone speeds up the reaction which, however, proceeds with reasonable speed without such agent, particularly when good agitation is employed. An emulsifying agent also helps the reaction to get under way at somewhat lower temperatures than in the absence of such material.

The hydrazine employed may be derived from any source or it may be generated in situ. Thus hydrazine per se or hydrazine hydrate (solution of hydrazine and water) may be employed as the starting material, or a salt of hydrazine such as a sulfate or a hydrochloride may be employed, in which case sufficient additional hydroxide is employed to liberate free hydrazine from its salt.

The following examples are given by way of illustration and not of limitation.

*Example 1*

A 3-neck, 3-liter flask equipped with stirrer, dropping funnel, reflux condenser, and thermometer well was charged with the following: 117 g. of 54.5% aqueous solution of hydrazine (2.0 moles of hydrazine); 160 g. (4.0 moles) of sodium hydroxide in 750 g. of water; and 0.5 g. of an emulsifying agent, namely, p-tert-octylphenoxyethoxyethyl dimethyl benzyl ammonium chloride, in 30 g. of water.

Stirring was commenced and 40 g. of carbon disulfide was added. During the next 10 minutes the carbon disulfide went into solution, and the temperature of the reaction mixture increased from 20° C. to 30° C. Addition of carbon disulfide was continued, and the reaction temperature was permitted to rise to 45° C., after which it was maintained between 40° C. and 45° C., by means of an ice bath during the earlier stages of the reaction and of external heating during the later stages. A total of 304 g. (4.0 moles) of carbon disulfide was added during 1.75 hours.

Stirring was continued and temperature conditions were maintained as before for 30 minutes. The odor of hydrogen sulfide became evident at the vent during the early part of this period, and at the end of the period the reaction mixture consisted of a clear yellow solution. This solution was rapidly heated to about 80° C. and stirred at this approximate temperature for 1 hour. Evolution of hydrogen sulfide was copious during most of this period, and was small toward the end of the period.

The solution was allowed to cool to about 40° C. during the next hour. Because of probable losses of carbon disulfide by entrainment with the hydrogen sulfide which had been evolved, stirring was continued and 61 g. (0.8 mole) of carbon disulfide was added to the solution during the following hour. Hydrogen sulfide was evolved in the earlier stages of this period, but by the end of the period the evolution had practically ceased. Stirring was discontinued, and some unreacted carbon disulfide was noted in the reaction mixture. Therefore, in order to remove this carbon disulfide, the mixture was heated to about 60° C. and the system was placed under reduced pressure for a few minutes.

The solution was then cooled to about 25° C., diluted with 650 g. of water, and filtered to remove a small amount of brown tar, the filtrate being clear yellow. There was thus obtained an approximately 20% (by weight) solution of 1,3,4-thiadiazolyl-2,5-disodium mercaptide.

*Example 2*

Apparatus of the kind described in Example 1 was charged with 292 g. of 54.9% aqueous solution of hydrazine (5.0 moles of hydrazine), and 400 g. (10.0 moles) of sodium hydroxide in 1150 g. of water.

The solution was heated to 46° C., stirring was commenced and heating was discontinued, and 100 g. of carbon disulfide was added. After about 25 minutes this portion of carbon disulfide had been consumed and the pot temperature had risen to 50° C. Additional carbon disulfide was added at such rate as to maintain a reflux of this material and pot temperatures ranging from 48° C. to 50° C. Additions were made as follows:

100 g. in 20 min.
200 g. in 30 min.
200 g. in 15 min.
160 g. in 20 min.

During the final 10 minutes of the addition period, heating was required to maintain the desired reaction temperature.

Stirring was continued and the temperature of the reaction mixture was maintained at about 50° C.; evolution of hydrogen sulfide commenced after about 10 minutes. The reaction mixture was heated to about 105° C. during the next 45 minutes, and was maintained at this approximate temperature for an additional 15 minutes. Evolution of hydrogen sulfide was vigorous during most of this 1 hour period, but had greatly diminished toward the end of the period.

The resulting clear yellow solution was rapidly cooled to about 50° C. and maintained at about this temperature for an hour, during which time 114 g. of carbon disulfide was added as make-up. The same temperature conditions were maintained for another hour, after which the temperature of the mixture was slowly raised to about 80° C. during the next half hour. During these manipulations, a moderate evolution of hydrogen sulfide was noted.

The system was then placed under reduced pressure for a short time in order to remove excess carbon disulfide.

The solution was heated to about 105° C. and maintained at that temperature for 30 minutes; there was no appreciable evolution of hydrogen sulfide toward the end of the period.

Stirring was discontinued and the solution was cooled to room temperature. There was thus obtained 2400 g. of an approximately 40% (by weight) solution of 1,3,4-thiadiazolyl-2,5-disodium mercaptide. This solution was yellow-orange in color and had a specific gravity of 1.305 at 20° C.

*Example 3*

The apparatus employed in Example 2 was charged with the same quantities of aqueous hydrazine and aqueous sodium hydroxide as in that example. In addition, the charge contained 0.5 g. of the same emulsifying agent as was used in Example 1.

The solution was heated to 46° C., stirring was commenced, and heating was discontinued, after which 100 g. of carbon disulfide was added during 7 minutes. During this addition, it became necessary to apply external cooling in order to maintain the reaction mixture within the desired temperature range of 48° C. to 50° C. More carbon disulfide (660 g.) was added during 48 minutes; the mixture was externally cooled during most of the period.

After all the carbon disulfide had been added, it was necessary to heat the reaction mixture in order to maintain it within the temperature range stated above. Hydrogen sulfide evolution commenced after 5 minutes.

From this point, the reaction was completed substantially the same as in Example 2, and with substantially the same observations as to evolution of hydrogen sulfide.

The product after filtration weighed 2390 g. and comprised an approximately 40% (by weight) solution of 1,3,4-thiadiazolyl-2,5-disodium mercaptide. The color of this solution was yellow-orange and the specific gravity at 20° C. was 1.306.

*Example 4*

Reactants as follows were charged into apparatus of the kind described in the preceding examples: 117 g. of 54.5% aqueous solution of hydrazine (2.0 moles of hydrazine), and 160 g. (4.0 moles) of sodium hydroxide in 780 g. of water.

Stirring was commenced and 40 g. of carbon disulfide was added. During the next 10 minutes the mixture developed a noticeable yellow color; the original temperature of 26° C. did not rise appreciably.

About 0.25 g. of 3-(dodecylphenoxy)-2-hydroxypropyl triethyl ammonium chloride was then added to the reaction mixture, and during the next 10 minutes the mixture became deeper yellow in color, the carbon disulfide went into solution, and the temperature rose to 40° C. Carbon disulfide (289 g.) was added during the next 90 minutes, temperature conditions being maintained between 45° C. and 50° C. by means of occasional cooling.

Heating was then required to maintain the above desired reaction temperature, and the odor of hydrogen sulfide soon became apparent at the vent. A final portion (30 g.) of carbon disulfide was then added, and the mixture was maintained between 45° C. and 50° C. During the next 20 minutes the evolution of hydrogen sulfide was rapid, and the reaction mixture became clear.

This solution was then heated to 90° C. and maintained at that temperature for 1 hour; very little hydrogen sulfide was evolved during the last half of this period.

Stirring was discontinued, the solution was cooled to room temperature, and diluted with 650 g. of water. The approximately 20% solution of 1,3,4-thiadiazolyl-2,5-disodium mercaptide thus obtained was yellow.

Any other alkali metal hydroxide or ammonium hydroxide may be substituted for the hydroxide used in the above examples.

Likewise, any other emulsifying agent may be employed. Emulsifying agents having low-foaming properties are preferred, as is obvious when it is recalled that hydrogen sulfide is evolved in vapor phase from the reaction mixture. However, it should be borne in mind that the use of emulsifying agents of somewhat higher-foaming characteristics may often be made feasible, through the conjoint use of a small amount of antifoaming agent, e. g. glyceride oils, silicone oils, octanol-2, lauryl alcohol, etc.

Among suitable emulsifying agents there may be mentioned those of cationic, anionic, and nonionic types. Examples of cationic emulsifying agents include quaternary ammonium compounds, such as p-tert-octylphenoxyethoxyethyl dimethyl benzyl ammonium chloride, hexadecyl-dimethyl benzyl ammonium chloride, hexadecylpyridinium bromide, dodecyl dimethyl methallyl ammonium chloride, hexadecylquinolinium chloride, tetradecyl dimethyl cyclohexyl ammonium chloride, 3-myristamidopropyl dimethyl benzyl ammonium chloride, dodecylthioethyl diethyl benzyl ammonium bromide, 3-tert-octadecylthio-2-hydroxypropyl triethyl ammonium chloride, 3-tert-octylphenoxy-2-hydroxypropyl dimethyl benzyl ammonium chloride, p-stearoylphenyl trimethyl ammonium methosulfate, etc.; sulfonium compounds, such as hexadecyl methyl ethyl sulfonium bromide, dodecyl dimethyl sulfonium sulfate, etc. Examples of anionic emulsifying agents include soaps such as sodium oleate, sodium stearate, etc.; sulfuric acid esters such as the sodium salts of sulfated vegetable and animal fats and oils, e. g. olive oil, castor oil, tallow, sperm oil, cottonseed oil, soybean oil, etc., the sodium salts of sulfated esters such as sulfated amyl oleate, sulfated butyl ricinoleate, etc., salts of sulfated alcohols such as sodium lauryl sulfate, sodium salts of sulfated mixed alcohols derived from coconut oils, sodium salts of sulfated olefins, e. g. terpenes, polymerized olefins, etc.; alkaryl sulfonates such as sodium dodecylbenzene sulfonate, sodium nonylnaphthalene sulfonate, sodium diisopropylnaphthalene sulfonate, sodium butyldiphenyl sulfonate, sodium salts of various sulfonated kerylbenzenes, etc.; alkane sulfonates such as water-soluble sodium salts of petroleum sulfonic acids, etc. Examples of nonionic emulsifying agents include high molecular weight alkyl polyglycolethers and analogous thioethers, such as decyl, dodecyl, and tetradecyl polyglycolethers and thioethers containing from 25 to 75 carbon atoms, high molecular weight alkaryl polyglycolethers, etc.

While the invention has been described in connection with batch operations, it will be understood that it may also be practiced semi-continuously or continuously, if desired.

While the invention has been more particularly described in connection with hydroxides which in the presence of water yield alkali metal or ammonium cations, it is to be understood that any equivalent bases may be employed, such as the corresponding oxides.

Any suitable amount of emulsifying agent may be employed, for example, between 0.005% to 1% by weight of the total reaction mass.

Having described the invention, it is understood that this is by way of illustration and that changes, omissions, additions, substitutions and/or modifications may be made within the scope of the claims without departing from the spirit of the invention. Accordingly, it is intended that the patent shall cover by suitable expression in the claims the features of patentable novelty which reside in the invention.

This application is a continuation-in-part of our copending application Serial No. 258,502, filed November 27, 1951, now formally abandoned.

We claim:

1. A process which comprises reacting in media which is substantially completely aqueous and in intimate admixture, hydrazine, carbon disulfide, and a base yielding cations from the group consisting of cations of alkali metals and ammonium, to produce dimercaptide of 1,3,4-thiadiazole-2,5-dithiol.

2. The process of claim 1 in which the reactants are admixed in substantially stoichiometric amounts.

3. The process of claim 2 in which the base yields sodium cations and in which the reaction is carried out under temperature conditions not exceeding 150° C.

4. The process of claim 3 in which the reaction is carried out in the presence of an emulsifying agent.

5. The process of claim 1 in which the base yields sodium cations.

6. The process of claim 1 in which the reaction is carried out under temperature conditions not exceeding 150° C.

7. The process of claim 1 in which temperature conditions are maintained between 20° C. and 110° C.

8. The process of claim 1 in which temperature conditions are maintained between 40° C. and 100° C.

9. The process of claim 1 in which the reaction is carried out in the presence of an emulsifying agent.

References Cited in the file of this patent

UNITED STATES PATENTS

| Number | Name | Date |
|---|---|---|
| 1,894,344 | Christmann et al. | Jan. 17, 1933 |
| 2,331,749 | Watt | Oct. 12, 1943 |

FOREIGN PATENTS

| Number | Country | Date |
|---|---|---|
| 81,431 | Germany | May 11, 1895 |